Dec. 8, 1936.　　　　C. TAPPAN　　　　2,063,566
SOUND-ON-FILM APPARATUS
Filed Sept. 3, 1935

INVENTOR.
Chester Tappan
BY
ATTORNEY.

Patented Dec. 8, 1936

2,063,566

UNITED STATES PATENT OFFICE 2,063,566

SOUND-ON-FILM APPARATUS

Chester Tappan, New York, N. Y., assignor to General Talking Pictures Corporation, New York, N. Y., a corporation of Delaware Application September 3, 1935, Serial No. 38,856

2 Claims. (Cl. 179—100.3)

The present invention relates to improvements in sound-on-film apparatus, one object of the invention being the provision of means, when a slit block is employed for reducing the quiver upon the film as it passes the slit block, and thus insure a better sound reproduction. Another object of this invention is a provision of a sound head in which means is provided for resiliently gripping the film just before the same passes the slit block, to in turn produce a slight drag that insures a close relative position at the point of translation so that the desired position of the sound track is maintained at all times.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
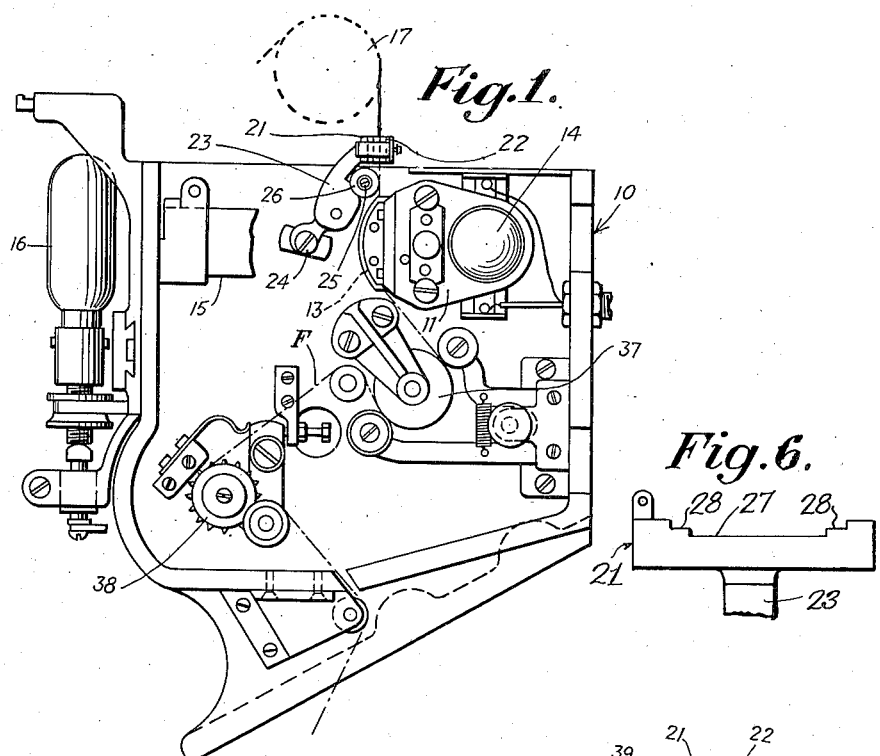
Fig. 1 is a side view of the sound head with one wall removed to show the internal mechanism.
Figure 6:
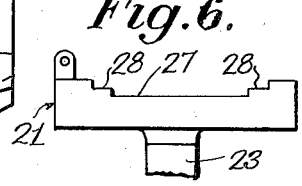
Fig. 6 is a side view showing the depressed portion of the fixed member of the present device.
Figure 2:
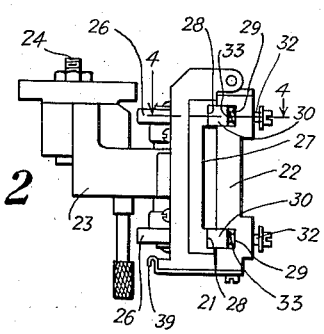
Fig. 2 is a top plan view of the present invention.
Figure 3:
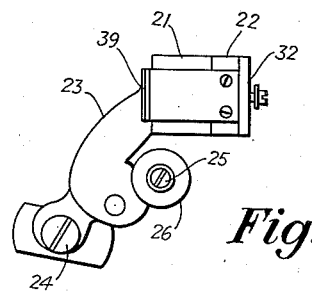
Fig. 3 is an end view thereof, taken at right angles to Fig. 2.
Figure 4:
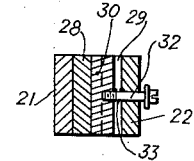
Fig. 4 is a section on a line 4—4 of Fig. 2.
Figure 5:
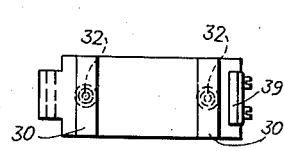
Fig. 5 is a plan view of the hinged member taken from the inner face thereof.

Referring to the drawing:

The numeral 10 designates the main casing of the sound head, 11 a slit unit or block having a curved film receiving surface 13, and also carrying a photoelectric cell 14. The usual optical system 15 and exciter lamp 16 is also shown.

In order to fully understand the present invention, the description will be given so as to at the same time describe the passage of the film F, which is here shown as being delivered from above and may be controlled by the usual picture projecting mechanism (purposely not shown). A sprocket 17 (shown in dotted lines) which is known as the constant speed sprocket of a motion picture projection machine, permits the film to pass to the sound head. From this point on the film passes between the fixed member 21 and the hinged member 22 of the present invention. These two members are carried by an arm 23 which is removably attached to the sound head casing by means of the screw 24, and below the fixed member is mounted for slight swinging movement a shaft or stud 25 carrying the film contacting rollers 26, two in number.

The inner surface of the fixed member of this device is milled to provide a central depressed portion 27 and two raised film engaging portions 28, which aline with the parallel recesses 29 formed in the hinged member, this hinged member carrying in each recess a spring projected film engaging pressure foot or bar 30 which is so mounted as to have slight longitudinal swinging motion as well as a straight line movement, a single pin 32 carrying each shoe and forming a resilient film engaging pressure foot to contact the film upon the opposite face to its contact with the raised portions of the fixed member. Each spring 33 is so tensioned as to cause its foot to very delicately touch the film so that as the film is drawn downwardly a slight retarding action is exerted at this point. This entire member so guides the film upon the curved surface of the slit block, with the assistance of a spinwheel 37 and the lower sprocket wheel 38 that the film is drawn through the sound head firmly and closely upon the curved surface of the slit block, preventing any outward quiver of the film at the point of translation.

In order to facilitate the introduction of the film into this quiver-preventing device, the hinged member carries at its free end a spring catch plate 39 which cooperates with the fixed member to hold the parts in proper relative position to each other and the film.

From the foregoing description taken in connection with the drawing, it is evident that with the present device mounted in the sound head, any tendency for the film during its rapid movement through the sound head to buckle or swing outwardly away from the slit block, is prevented, and a better quality of sound production is assured.

The present device is in the nature of a mechanical filter, and is so disposed in the sound head as to filter out any of the mechanical effects that would be produced if the film was not held in constant even contact or position with the slit block, and particularly at the point of translation. Therefore, the broadest possible interpretation of the present invention is intended hereby.

What is claimed is:

1. A sound-on-film reproducing apparatus including in combination a supporting structure, a slit block having a curved film receiving surface, means therebelow for drawing the film past said surface at a continuous speed, and means located above the slit block for exerting a steadying and retarding action upon the film, whereby the relative sliding contact upon the film receiving surface is maintained uniform, the latter means including a fixed member, a movable member hingedly connected thereto, cooperative film guiding and engaging means carried by the opposed faces of such member, and a resilient film engaging means upon the inner face of one of said members.

2. A sound-on-film reproducing apparatus including in combination a supporting structure, a slit block having a curved film receiving surface, means therebelow for drawing the film past said surface at a continuous speed, and means located above the slit block for exerting a steadying and retarding action upon the film, whereby the relative sliding contact upon the film receiving surface is maintained uniform, said latter means including a fixed member having spaced parallel surfaces to contact the moving film adjacent its edges, a hinged member connected to the fixed member, means for removably connecting the two members in a relatively fixed position and two resiliently mounted film engaging devices carried by the hinged member, whereby when the members are in film engaging position, the film at its edges has exerted thereon a resilient clamping effect.

CHESTER TAPPAN.